Dec. 5, 1967   H. MÜLLER   3,356,219
FILTER ELEMENT PRECOAT REMOVAL MEANS
Filed Jan. 21, 1965   2 Sheets-Sheet 1

Inventor:
HANS MÜLLER
By Shoemaker and Mattare
Attys.

Dec. 5, 1967 H. MÜLLER 3,356,219
FILTER ELEMENT PRECOAT REMOVAL MEANS
Filed Jan. 21, 1965 2 Sheets-Sheet 2

INVENTOR
HANS MÜLLER
By Shoemaker and Mattare
Attys.

3,356,219
FILTER ELEMENT PRECOAT REMOVAL MEANS
Hans Müller, Erlenbach, Zurich, Switzerland
Filed Jan. 21, 1965, Ser. No. 427,022
Claims priority, application Germany, Jan. 22, 1964,
M 47,126
4 Claims. (Cl. 210—193)

This invention relates to a filter device and in particular to a filter device for use with rotary disc filters.

In alluvial filters it is known for fibrous materials either to be applied previously to the filtering surfaces or filter fabric, or to be added to the filtering material so as to form a thicker or stronger layer capable of retaining impurities during the filtering process. A reinforced filtering layer is needed particularly for filtering beer so that a perfect non-turbid drink may be obtained. For this purpose it is customary to place special relatively thick plates (about 3 to 4 centimetres thick) of suitable material onto the filter elements to take over the function of the layer of alluvial fibres. The plates are applied before filtering begins and removed when it is over for cleaning and/or regeneration.

Such plates cannot economically be used in rotary disc filters since they must be removed each time after use, cleaned and/or regenerated, and replaced which involves too much laborious work to be at all worth while (the whole filtering column would have to be taken out of the housing each time and reinserted).

The object of the present invention is to provide a method of using rotary disc filters for filtering beer, i.e. of applying a relatively thick alluvium of fibrous material which can be centrifuged away at the end of the filtering process. Accordingly, the present invention provides a filter device for rotary disc filters, wherein the residue, alluvial mass or the like is centrifuged away at the end of the filtering process, the filter device comprising a hollow shaft and filter elements mounted on said shaft, each of said filter elements comprising a base plate projecting from said shaft, a filter fabric joined to said base plate at a margin of said plate remote from said shaft, and a rim on said base plate extending beyond said filter fabric for retaining the residue, alluvial mass or the like on the filter fabric during the filtering process and not retaining them during the centrifuging process.

Another object of the present invention is to provide a filter device in which the rim is formed by the base of the filter elements which projects beyond the outer edge of the filter fabric and is preferably directed obliquely outwardly and upwardly. Depending on the relative height of the overlapping rim a correspondingly thick alluvial layer may be built up which can easily be removed during centrifuging but which will not break away from the edge of the filter element during the filtering process. After being centrifuged and discharged from the housing the alluvial materials may readily be regenerated and can then be used again.

Yet another object of the invention is to provide a filter device in which the rim is formed of several lengths each hinged to the base plate and resilient means are provided to hold the lengths inclined to the base plate during the filtering process, the resilient means being overcome during the centrifuging process so that the various lengths are coplanar with the base plate. Preferably, the resilient means comprises a tying spring extending completely around the filter element and holding all of the lengths inclined to the base plate during the filtering process. However, any other suitable resilient means may be used if desired.

Other objects of the invention, together with means and methods for attaining the various objects will be apparent from the following description of the invention and by reference to the accompanying drawings which show, by way of example, preferred embodiments thereof. In the drawings.

Figure 1:
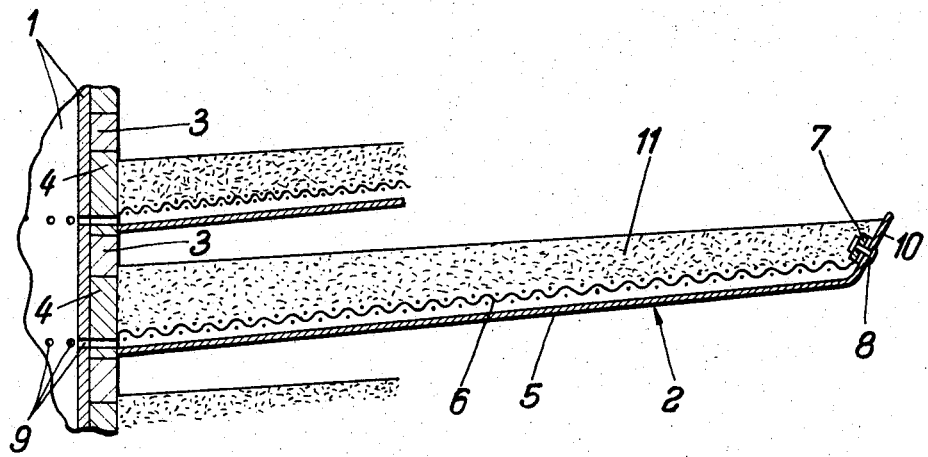
FIG. 1 is a vertical section through part of a column of filter elements according to one form of the invention.

Referring to FIG. 1 of the drawings, disc-like filter elements 2 are mounted one above the other on a hollow shaft 1 which also serves to discharge the filtrate. The filter elements 2 are kept apart by spacing rings 3 inserted between each of the hubs 4 of the elements 2.

The filter elements 2 each comprise an impervious base plate 5, which is preferably inclined towards the hollow shaft 1 but which may be horizontal, and a filter fabric 6, spaced from the base plate 5 and normally in the form of a wire mesh, the filter fabric 6 being connected to the base plate at the edge remote from the hub 4, for example by an encircling, retaining strip 7 and screws 8. The filtrate penetrating through the fabric 6 flows along the base plate 5 to the hollow shaft 1 and passes through holes 9 in the latter into the inside of said shaft 1 whence it is conveyed to a container (not shown).

According to the invention, the rim of the base 5 is extended beyond the joint between the base 5 and the filter fabric 6 to form a projecting portion 10. This projecting portion 10 may be at an angle to the base as shown in FIG. 1, and the preferred angle is between 30° and 45°. The essential requirement is that the projecting portion 10 should ensure that alluvial fibres 11 cannot drop off the rim during the filtering process, i.e. when the plates 2 are not rotated and that the projecting portion should not retain the alluvial fibres when it is centrifuged.

Figure 2:
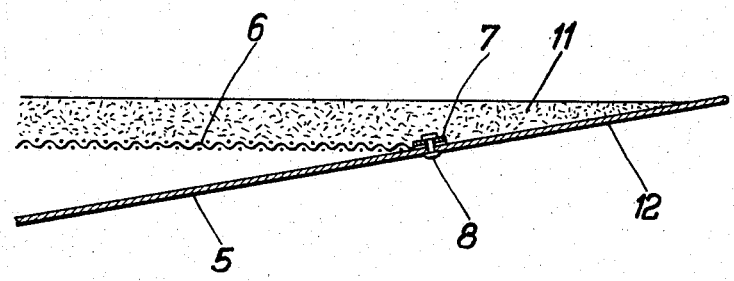
FIG. 2 is a vertical section through part of a filter element according to a second form of the invention.

FIG. 2 shows a filter element similar to that illustrated in FIG. 1 but in this case the base plate 5 of the filter element 2 is merely extended beyond the joint between the base and the filter cloth to form a rim 12 coplanar with the base plate 5. In this form of the invention, the base plate 5 must be inclined upwardly at an angle of less than 90° to the shaft 1.

Figure 3:
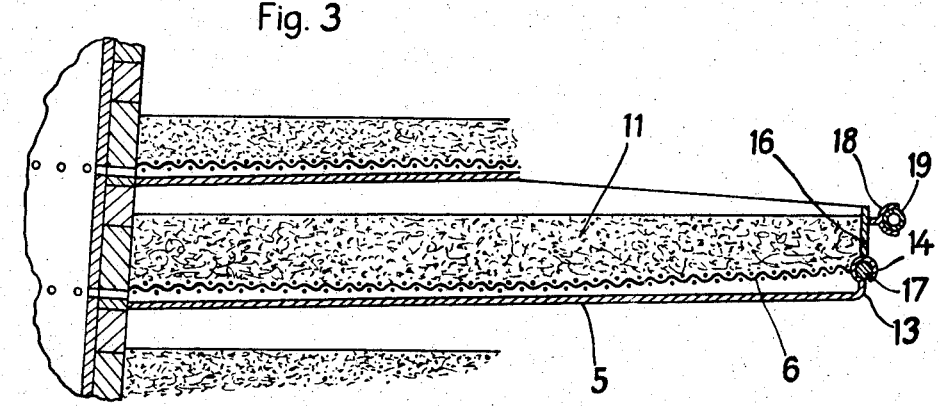
FIG. 3 is a vertical section through part of a column of filter elements according to a third form of the invention.
Figure 4:
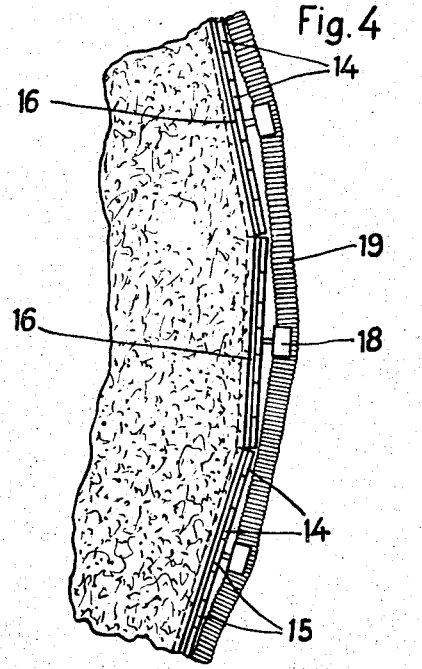
FIG. 4 is a partial plan of the periphery of the complete filter element shown in FIG. 3 the rim being formed of several separate lengths.
Figure 5:
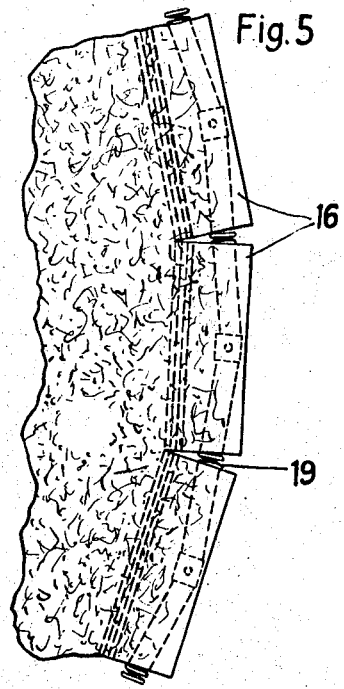
FIG. 5 is a plan similar to FIG. 4 but showing the separate lengths of the rim in a different position.

Reference will now be made to FIGS. 3 to 5 of the accompanying drawings in which the base plate 5 is bent up slightly at its outer periphery to the level of the filter cloth 6 and is rolled in at the end of the bent-up portion 13 to form an almost closed ring. The bent-up portion 13 can be divided into smaller sections 14 when the ring can form one part of a hinge on each section 14. Correspondingly formed sections 15 can be placed between gaps formed between the sections 14 of the ring, each section 15 forming part of a hinged member 16. The hinged member is pivotally connected to the plate 5 by passing a bar or rod 17 through the sections 14 and 15.

In the raised state, the hinged member 16 acts as a wall for the alluvial fibres 11, so that the latter cannot drop down during the filtering process, i.e. while the filter elements are stationary. Each of the members 16 has a straight edge and the periphery of the base plate 5 is shaped so that the edges adjoining the plates 16 are correspondingly straight so that the base plate 5 has a polygonal shape when viewed from above.

A holder 18 is attached to the outside of each hinged member 16. All the holders 18 of a filter element together carry an endless tying spring 19 which extends around the filter element and holds the hinged member 16 in the raised position so long as the filter element is stationary or until slow rotation takes place at the beginning of the centrifuging process. When the speed of the shaft and thus of the filter elements increases so that centrifugal force becomes effective the hinged members 16 are forced outwards and hence lowered by the residue which endeavours to move outwardly due to centrifugal force. As the hinges, i.e. pivotal axes of the hinged members 16, are at the same level as the filter cloth 6, the residue or filter cake can be centrifuged radially outwardly without any hindrance so that all, or very nearly all, is removed from the filter cloth.

Instead of the tying spring 19 illustrated each hinge member can be held across the filter element by a tension spring fixed to the shaft.

Various other embodiments and modifications of the invention are possible without departing from the spirit and scope of the invention as defined by the appended claims.

What is claimed is:

1. A filter device comprising, in combination, a rotatable shaft; and at least one filter carried by said shaft for rotation therewith, said filter comprising a base plate portion having an upper surface extending transversely of said shaft, filter means comprising a screen carrying particulate filtering material carried by said base plate portion overlying and substantially coextensive with said upper surface, and a confining portion extending circumferentially of said base plate portion upwardly beyond said filter means so as to confine an effective amount of solid fraction retained in said particulate matter, said confining portion being constituted from a plurality of discrete sections hingedly connected to said base plate portion and being movable between a first position in which said confining portion retains said fraction and said particulate matter, and a second position different from said first position, said confining portion having a composite inner surface which diverges upwardly with respect to said filter means in said first position of said discrete sections, and which diverges outwardly with respect to said filter means in said second position of said discrete sections so as to permit automatic centrifugal ejection of said particulate material in response to rotation of said shaft; and biasing means urging said sections to said first position thereof.

2. A filter device as defined in claim 1, wherein said biasing means comprises an annular spring extending completely around said filter and being adapted to hold all of said discrete sections in said first position during the filtering process.

3. A filter device as defined in claim 1, wherein said filter means comprises a filter cloth carried by said base plate portion and a layer of alluvial mass carried on said filter cloth, said alluvial mass constituting said particulate filtering material which is to be ejected in response to rotation of said shaft.

4. A filter device comprising, in combination, a rotatable shaft; and at least one filter carried by said shaft for rotation therewith, said filter comprising a base plate portion having an upper surface extending transversely of said shaft, filter means including a filter screen carried by said base plate portion overlying and substantially coextensive with said upper surface and a layer of particulate filter material carried on said screen, a confining portion extending circumferentially of said base plate portion and having an inner surface which diverges upwardly and outwardly with respect to said filter means, said confining portion being constituted from a plurality of discrete sections hingedly connected to said base plate portion and being movable between a first position in which said confining portion retains said particulate filter material and a second position different from said first position in which said confining portion permits automatic centrifugal ejection of said particulate filter material in response to rotation of said shaft, and biasing means urging said sections to said first position thereof.

References Cited

UNITED STATES PATENTS 3,107,217  10/1963  Muller _____ 210—331

FOREIGN PATENTS 797,512  2/1936  France.
346,862  7/1960  Italy.

REUBEN FRIEDMAN, *Primary Examiner.*

F. SPEAR, *Assistant Examiner.*